United States Patent [19]

Glachet

[11] 4,201,310

[45] May 6, 1980

[54] BIDIRECTIONAL JOINING DEVICE

[75] Inventor: Charles Glachet, Vendôme, France

[73] Assignee: La Calhene, Bezons, France

[21] Appl. No.: 13,667

[22] Filed: Feb. 21, 1979

[30] Foreign Application Priority Data

Feb. 24, 1978 [FR] France .................. 78 05331

[51] Int. Cl.² ............... B65D 51/28; B65D 51/18; F16J 15/32
[52] U.S. Cl. ................. 220/256; 220/307; 277/152; 277/207 R
[58] Field of Search ............ 220/256, 307; 277/152, 277/12, 153, 165, 166, 205, 207 R, 212 C

[56] References Cited

U.S. PATENT DOCUMENTS

| | | | |
|---|---|---|---|
| 2,782,956 | 2/1957 | Richman | 220/256 X |
| 3,015,510 | 1/1962 | Bates | 277/212 C X |
| 3,162,882 | 12/1964 | Womer | 220/256 X |
| 3,454,191 | 7/1969 | Mercier | 220/256 |
| 3,753,853 | 8/1973 | Schabert | 220/256 X |
| 3,866,794 | 2/1975 | Kerr | 220/256 X |
| 3,912,110 | 10/1975 | Hammes | 220/307 X |

FOREIGN PATENT DOCUMENTS 24482 9/1930 Australia .................. 220/256
2414634 10/1974 Fed. Rep. of Germany ........ 277/153

Primary Examiner—Robert S. Ward, Jr.
Attorney, Agent, or Firm—Pearne, Gordon, Sessions, McCoy & Granger

[57] ABSTRACT

Bidirectional joining device with an integral passage between a first enclosure having a flange serving as a seat for a first plug provided with a first gasket and a second enclosure having an opening, a second plug and a second gasket, whereby the first gasket is able to form the sealing between the first plug and the gasket and the first plug and the second plug when the latter are joined together, wherein the second enclosure has an opening provided with a lateral edge, the second plug has a peripheral edge perpendicular to the axis of the two plugs, a side wall having a convex portion and a bottom, the second gasket has an external lateral face, an internal lateral face and an upper face turned towards the outside of the second enclosure, said external lateral face being sealingly and not-detachably fixed to the lateral edge of the second enclosure, said inner lateral face having a first bead able to cooperate with the convex portion of the second plug to ensure the joining together of said second plug and the drum by locking the bead between the convex portion and the edge, said upper face being provided with an external annular contact area which is able to ensure by deformation sealing between the drum and the flange of the second enclosure when the two enclosures are joined together, a second annular contact area ensuring by elastic deformation the covering of the periphery of the peripheral edge of the second plug and sealing means between the upper face of the gasket and the peripheral edge of the plug.

6 Claims, 4 Drawing Figures

BIDIRECTIONAL JOINING DEVICE

BACKGROUND AND BRIEF SUMMARY OF THE INVENTION

The present invention relates to a bidirectional joining device with an integral passage between two enclosures.

More specifically, the invention relates to an assembly constituted by two enclosures, each of which is provided with an opening and a plug permitting, when said two enclosures are joined together, the simultaneous removal of the plugs in order to permit the transfer to take place between the enclosures without any significant change of atmosphere with the exterior.

The invention is of particular interest for the discharge or introduction from one enclosure relative to the other of a content which must either be protected from the external atmosphere (maintaining sterility in the medical field) or confined in order to protect the external atmosphere from its polluting action (confinement of radioactive contamination in the nuclear field or chemical toxicity).

More specifically, the invention has for its object a gasket of a particular type and with a multiple function, the arrangement of this gasket on the periphery of the opening of one of the enclosures ensures on the one hand a very good sealing between the enclosure and the plug thereof and on the other hand a very good sealing between said enclosure and the second enclosure when they are joined together.

The invention aims more particularly at the case where the enclosure carrying the special gasket is a conventional petrol drum with a capacity of 100 or 200 liters, the gasket being such that the modifications to be made to the drum are of a minor nature and can be carried out at very low cost.

Another object of the invention is to construct such a device in which the complete second enclosure, including the gasket and the plug is particularly inexpensive.

To achieve the above objects, the present invention relates to a bidirectional joining device between a first enclosure having a flange serving as a seat for a first plug provided with a first gasket and a second enclosure having an opening, a second plug and a second gasket, the first gasket providing sealing between the first plug and the flange and the first plug and the second plug when the latter are joined together, wherein the second enclosure has a circular opening, the second plug has a peripheral edge perpendicular to the axis of the two plugs, a lateral wall having a convex portion and a base, the second gasket has an external lateral face, an internal lateral face and an upper face turned towards the outside of the second enclosure, said external lateral face being sealingly fixed to the side wall of the second enclosure, said internal lateral face having a first bead for cooperating with the convex portion of the second plug to ensure the joining of the second plug to the drum by locking the bead between the convex portion and the edge, said upper face having an external annular contact area which is preferably a lip ensuring the sealing between the drum and the flange of the first enclosure when the two enclosures are joined together, the second annular contact area which is preferably a lip and ensures by deformation the contact with the peripheral edge surface of the second plug in order to bring about sealing between the latter and the upper face of the gasket.

Preferably, this device is characterized in that the gasket of the second enclosure has an annular groove in the inner lateral face partly separating the bead from the remainder of the gasket in order to permit a certain pivoting of the bead by elastic deformation under the action of the curved portion of the second plug during the penetration of the latter and a third contact area which is preferably an internal lip on the upper face of the gasket at the base of said bead in such a way that the third contact area can pivot at the same time as the bead prior to also being compressed by the peripheral edge of the second plug.

BRIEF DESCRIPTION OF THE DRAWINGS

The invention will be explained in greater detail hereinafter relative to non-limitative embodiments and with reference to the attached drawings, wherein show.

DETAILED DESCRIPTION OF THE PREFERRED EMBODIMENTS

Figure 1:
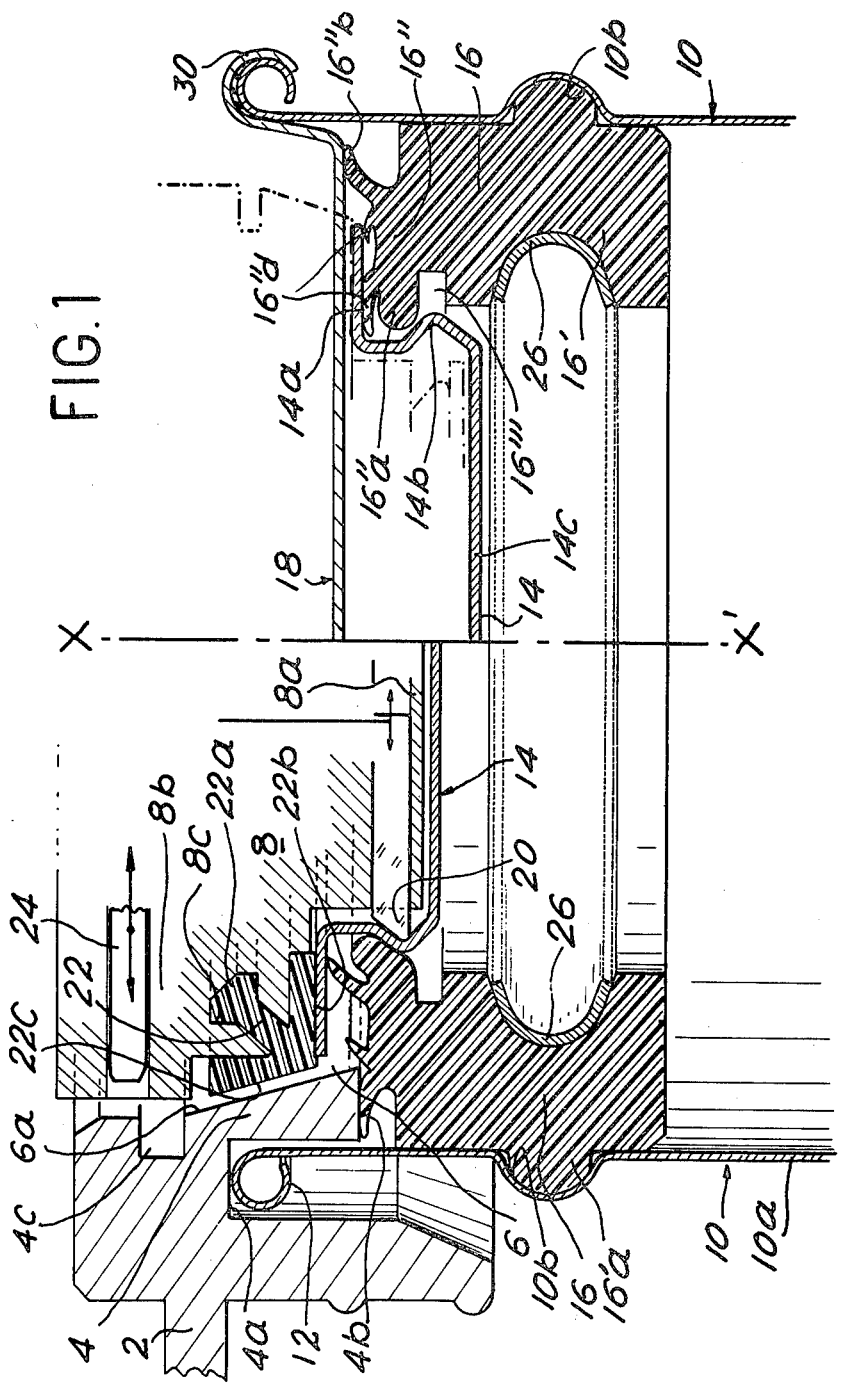
FIG. 1 two vertical sectional half-views, the right-hand half-view showing the second enclosure closed, the protective cover being fitted, whilst the left-hand half-view shows the two enclosures coupled together and the two plugs are assembled, whereby the latter are being extracted.

The half-view from the left of FIG. 1 shows the device in the case where the first enclosure, comprises a cell for the manipulation of contaminated objects and the second enclosure comprises a conventional petroleum drum.

In this view, it is possible to see the wall 2 of the cell with its flange 4 defining an access opening 6. Inter alia, flange 4 serves as a seat for plug 8 which hereinafter will be called cell door. The other enclosure comprises a drum 10 provided with an edge 12 and a plug 14 shown in the sealing position in the half-view from the right. The plug is fixed to the drum by a gasket 16. During transportation only, a mechanical protection cover 18 is placed above plug 14.

With respect to the cell, it is apparent that flange 4 has an annular groove 4a in which is placed the edge 12 of drum 10. Not shown mechanical means ensure the stowing of drum 10 on cell 2. Flange 4 also has a flat annular bearing surface 4b, whose function will be described hereinafter. The cell door 8 comprises a reduced diameter portion 8a which is able to penetrate the plug 14. This portion 8a is equipped with radial fingers 20 which can project out of portion 8a in order to ensure the locking of door 8 on plug 14. The widest portion 8b of door 8 is provided with a gasket 22, which has a bead 22a engaged in a corresponding groove 8c of portion 8b of door 8. Gasket 22 has a substantially planar active face 22b which, by deformation, ensures the sealing between door 8 and plug 14 when the latter are locked by fingers 20. Gasket 22 has a second active face 22c which is truncated cone-shaped with respect to the axis of revolution XX' of the complete installation. This active face 22c cooperates with the seat 6a of door 8, which is also truncated cone-shaped. Portion 8b of door 8 also comprises radiating fingers 24 which in the extracted position penetrate an annular groove 5c made in flange 4 of cell 2. These fingers 24 ensure the locking of door 8 in the closed position on flange 4. The sealing of this closure is ensured by crushing face 22c of gasket 22 on seat 6a of flange 4.

Drum 10 with its gasket 16 and its plug 14 will now be described.

A groove 10b serving for the fixing of gasket 16 is provided in the side wall 10a of drum 10. Groove 10b can be obtained at a very low price by machining using a cutting wheel. Gasket 16 comprises a body 16' serving for the fixing thereof to the drum and an extension 16'' which effectively serves as the deformable joint, said two portions being separated by an inner groove 16'''. Body 16' has on its outer lateral face a bead 16' which penetrates the groove 10b of the drum. The gasket is joined to the drum by adding an internal hoop 26 introduced into groove 16'b made in the inner lateral face of body 16' of gasket 16. This hoop 16 serves not only to provide the sealing between gasket 16 and drum 10, but also to take up any wearing out of round of the drum.

The upper part 16'' of gasket 16 essentially comprises an inner bead 16''a disposed immediately above the groove 16''' and three contact surfaces which in the present embodiment are deformable lips located on the upper face of upper part 16''. There is an outer lip 16''b directed towards the outside of the drum, an intermediate lip 16''c directed towards the inside of the drum, whereby said first two lips form a type of V with unequal branches when the latter are in the rest position and an inner lip 16''d turned towards the outside of the drum when it is in the rest position, the bottom of lip 16''d emanating from the bottom of bead 16''a and being in one piece with the latter.

On considering plug 14, it can be seen that it has an external flat edge 14a perpendicular to axis XX', a side wall provided with a flared enlargement 14b, forming an outer shoulder over the complete periphery of the plug and a bottom 14c. The external diameter of the side wall of plug 14 is smaller than the internal diameter of bead 16''a, but the external diameter of flared enlargement 14b is larger than the internal diameter of bead 16''a.

Figure 2:
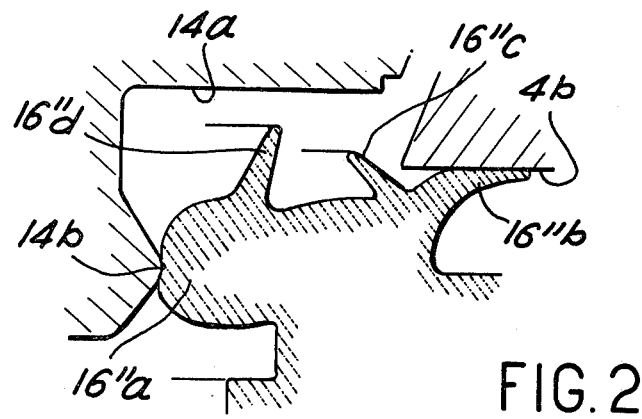
FIGS. 2 to 4 details showing the way in which for example the different lips of the gasket of the second enclosure function during the fitting of the plug of said second enclosure.
Figure 3:
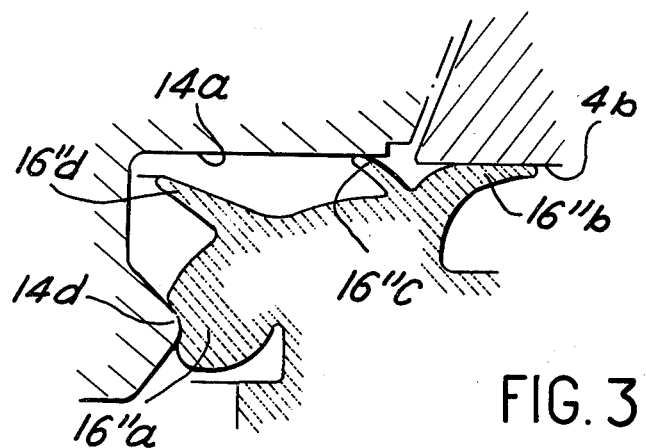
Figure 4:
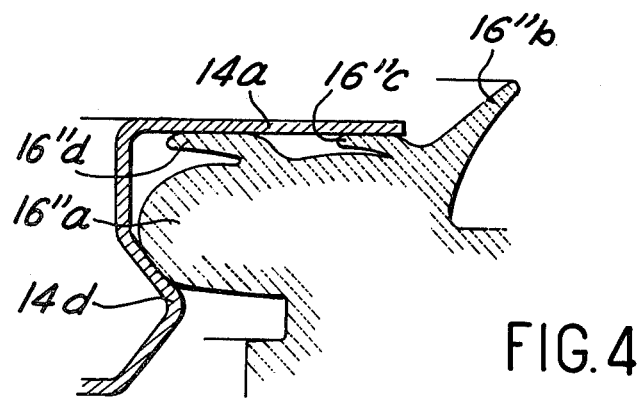

The operation of gasket 16 during the fitting of plug 14 will now be explained relative to FIGS. 2 to 4. Initially, lips 16''d and 16''c, as well as bead 16''a are in the inoperative position shown in solid lines in FIG. 2. Lip 16''b is also at rest. On starting the insertion of plug 14, shoulder 14b of the plug bears on bead 16''a prior to edge 14a of plug coming into contact with lip 16''d. There is then a downwards pivoting of the assembly comprising bead 16''a and lip 16''d, whereby the latter inclines in the other direction. This action is made possible by the presence of groove 16'''. When the penetration of plug 14 is complete (FIG. 4) lip 16''d is flattened against edge 14a and lip 16''c is flattened against the periphery of edge 14a. Bead 16''a is in contact with shoulder 14b which ensures the mechanical joining together of plug 14 and drum 10 via gasket 16. It should be noted that in the annular space defined by lip 16''c and 16''d and by edge 14a there is a suction effect which further improves the connection between the gasket and the plug and that in addition lip 16''c acts as a covering lip for the periphery of edge 14a.

As is shown in the half-view from the right of FIG. 1, the drum is provided with a cover 18 maintained on edge 12 of the drum by a deformable rounded portion 30. Joining can be improved by crimping portion 30 onto edge 12 or by a random mechanical assembly device. It is also possible to place a gasket between these two portions. Obviously, outer lip 16''b is flattened against the cover 30 which ensures a second sealing area between the inside of the drum and the external environment.

All the operations involved in ensuring the transfer of an object contained in cell 2 to drum 10 will now be described.

(a) Cover 18 of the drum is removed
(b) edge 12 of the drum is introduced into groove 4a of the flange and the drum is mechanically fixed to the cell, lip 16''b is compressed by portion 4b of the flange, whilst portion 8a of the cell door penetrates the plug 14;
(c) action is effected on fingers 20 so as to join plug 14 and door 8 and door 8 is disengaged from flange 4 by retracting fingers 24;
(d) using a not shown mechanism within the cell, the assembly constituted by door 8 and plug 14 is removed, whereby communication between the drum and the cell, as well as sealing is ensured by lip 16''b;
(e) once the transfer has been carried out, the operations are carried out in the reverse order to free the drum.

The same connecting device could be used to ensure a tight connection between one cell and a second enclosure, which is not a drum. No modification would be necessary to gasket 16 other than the fixing of the first gasket in the flange of the second enclosure.

The gaskets are made from elastic materials or materials permitting deformation so that several fitting and removal operations of the plug can be performed. Thus, the gasket must be able to operate on a bidirectional basis, whereby elastomers are advantageously used.

As can be gathered from the above description, the only part of the drum and more specifically the gasket 16 which is not covered by plug 14 in normal operation is reduced to a fraction of one of the sides of lips 16''b and 16''c. This area is negligible in view of the relatively small dimensions of these lips. Moreover, during the storage of the drum, the latter has a mechanical protection cover 18 and the contaminated portion of lip 16''b is flattened against cover 18.

The invention is not limited to the embodiments described and represented hereinbefore and various modifications can be made thereto without passing beyond the scope of the invention.

What is claimed is:

1. A bidirectional joining device with an integral passage between a first enclosure having a flange serving as a seat for a first plug provided with a first gasket and a second enclosure having an opening, a second plug and a second gasket, whereby the first gasket is able to form the sealing between the first plug and the gasket and the first plug and the second plug when the latter are joined together, wherein the second enclosure has an opening provided with a lateral edge, the second plug has a peripheral edge perpendicular to the axis of the two plugs, a side wall having a convex portion and a bottom, the second gasket has an external lateral face, an internal lateral face and an upper face turned towards the outside of the second enclosure, said external lateral face being sealingly and not-detachably fixed to the lateral edge of the second enclosure, said inner lateral face having a first bead able to cooperate with the convex portion of the second plug to ensure the joining together of said second plug and the drum by locking the bead between the convex portion and the edge, said upper face being provided with an external annular contact area which is able to ensure by deformation sealing between the drum and the flange of the second enclosure when the two enclosures are joined together, a second annular contact area ensuring by elastic deformation the covering of the periphery of the peripheral edge of the second plug and sealing means between the upper face of the gasket and the peripheral edge of the plug.

2. A device according to claim 1, wherein the gasket of the second enclosure has an annular groove made in the internal lateral face partly separated from the bead and from the remainder of the gasket in order to permit a certain pivoting of the bead by elastic deformation under the action of the convex portion of the second plug during the penetration of the latter and a third internal contact area provided on the upper face of the gasket at the bottom of said bead in such a way that this third contact area can pivot at the same time as the bead before being compressed by the peripheral edge of the second plug.

3. A device according to claim 1, wherein the second enclosure comprises a drum, whose side wall is provided with an annular groove turned towards the inside of the drum, whilst the second gasket has on its outer lateral face a second bead able to penetrate the groove of the drum.

4. A device according to claim 3, wherein the second gasket has an internal hoop applied to the internal lateral face thereof with respect to the second bead.

5. A device according to claim 3, wherein the third internal contact area is, prior to pivoting, inclined towards the outside of the drum with respect to the axis thereof and after pivoting it is inclined towards the inside of the drum with respect to the axis thereof.

6. A device according to claim 1, wherein the contact areas are constituted by lips.

* * * * *